United States Patent
Vincenzi et al.

(10) Patent No.: US 6,252,015 B1
(45) Date of Patent: Jun. 26, 2001

(54) PROCESS FOR THE PRODUCTION OF POLYMER

(75) Inventors: Paolo Vincenzi, Ficarolo; Arrigo Arletti, Finale Emilia, both of (IT)

(73) Assignee: Montell Technology Company BV (NL)

( * ) Notice: Subject to any disclaimer, the term of this patent is extended or adjusted under 35 U.S.C. 154(b) by 0 days.

(21) Appl. No.: 09/486,098

(22) PCT Filed: Jun. 16, 1999

(86) PCT No.: PCT/EP99/04165

§ 371 Date: Feb. 22, 2000

§ 102(e) Date: Feb. 22, 2000

(87) PCT Pub. No.: WO00/00522

PCT Pub. Date: Jan. 6, 2000

(30) Foreign Application Priority Data

Jun. 27, 1998 (EP) .................................................. 98202163

(51) Int. Cl.$^7$ ........................................................ C08F 2/34
(52) U.S. Cl. .................. 526/62; 526/59; 526/61; 526/74; 526/88; 526/113; 526/228; 526/901; 526/921
(58) Field of Search ................................. 526/59, 61, 62, 526/74, 88, 113, 228, 901, 921

(56) References Cited

U.S. PATENT DOCUMENTS

| 3,629,083 | 12/1971 | Brendle | 204/165 |
|---|---|---|---|
| 4,532,311 | * 7/1985 | Fulks et al. | 526/62 |
| 4,855,370 | 8/1989 | Chirillo et al. | 526/74 |
| 4,940,894 | * 7/1990 | Morters | 250/324 |
| 5,034,479 | 7/1991 | Eisinger et al. | 526/68 |
| 5,355,832 | 10/1994 | Loh et al. | 118/723 |
| 5,461,123 | 10/1995 | Song et al. | 526/74 |
| 5,648,581 | * 7/1997 | Kubo et al. | 585/501 |

FOREIGN PATENT DOCUMENTS

| 0 129 368 | 6/1984 | (EP) . |
|---|---|---|
| 0 416 815 | 3/1991 | (EP) . |
| 0 601 525 | 12/1993 | (EP) . |
| 0 605 002 | 7/1994 | (EP) . |
| 0 811 638 | 12/1997 | (EP) . |
| 1181502 | 2/1970 | (GB) . |
| 61-213228 | 9/1986 | (JP) . |
| 96/23010 | 8/1996 | (WO) . |
| 97/04015 | 2/1997 | (WO) . |
| 97/40921 | 11/1997 | (WO) . |

OTHER PUBLICATIONS

Käppel, et al., "Reduction of Agglomeration of Electrostatically Charged Plastic Powders", 42 *Chemie–Ing.–Techn.* 294–299 (1970).

* cited by examiner

Primary Examiner—David W. Wu
Assistant Examiner—William Cheung

(57) ABSTRACT

A process, particularly a gas phase fluidised bed process, for the production of polymers avoids formation of sheets or chunks within the reactor, without the need to use antistatic agents, which can reduce the activity of the catalyst or alter the characteristics of the yielded product. According to the invention, a device generates a corona discharge in the polymerisation reactor during the polymerisation process; an AC voltage difference is applied between the elements which constitute the discharging pair of the device.

16 Claims, 2 Drawing Sheets

PROCESS FOR THE PRODUCTION OF POLYMER

The present invention relates to a process for the catalytic production of polymer and, particularly, to a process for the production of (α-olefin polymers.

Such polymerisation processes can be carried out by bringing the monomers or their mixtures into contact with a catalyst comprising a compound of a transition metal and a suitable cocatalyst or activator. The processes can be suitably performed in a gas phase apparatus wherein the catalysts, usually supported on solid particles, and the monomers are fed to a fluidised bed made up by growing polymer particles and sustained by an upwardly flowing gas stream, essentially composed of unreacted monomers and, optionally, of suitable inert compounds. Said gas stream is introduced typically into the fluidised bed through a gas distribution plate of suitable conformation, placed below the bed. An enlargement of the cross section of the reactor (gas velocity reduction zone) above the bed reduces the velocity of the gas stream, so that entrained solid particles are separated from the stream and fall back into the bed. The gas leaving the fluidised bed is sent through a recycle line to a compressor and then recycled to the fluidised bed. On the said recycle line is generally placed a cooling means, to remove the heat generated by the polymerisation reaction. The produced polymer particles are withdrawn from the fluidised bed at such a rate to keep the level of the bed substantially constant. Other gas phase processes are carried out in circulated fluidised bed reactors as described in WO 97/04015. Other gas phase processes foresee the circulation of a monomer containing gas through a mechanically stirred bed of growing solid polymer particles. Still other processes used are those whereby the growing polymer particles are suspended in a liquid medium essentially composed of the monomers and, optionally, of suitable solvents or diluents.

It is well known that a problem of the above mentioned processes, more precisely those in which the polymer produced is in the form of a suspended solid in particle form, is the agglomeration of the polymer particles and their deposition on the reactor's walls, with formation of sheets of polymer. This problem is more serious when ethylene is polymerised. This phenomenon is probably due to the presence on the polymer particles of electrostatic charges of both positive and negative sign.

Various methods have been proposed to reduce this drawback in polymerisation processes. Such methods include the introduction into the polymerisation reactor of compounds capable of neutralising the electrostatic charge of the polymer particles, or, more generally, to avoid the occurrence of sticking. Other methods are based on monitoring the electrostatic potential within the reactor by means of probes of various kinds. The conditions of reaction are varied during the process in order to keep the measured value within levels at which the occurrence of sheeting is not expected.

U.S. Pat. No. 4,855,370 suggests the introduction of given amounts of water into the gas stream entering a gas phase polymerisation reactor prior to the formation of polymer sheets, detected by variations of the static potential in the reactor.

According to U.S. Pat. No. 5,034,479, the presence of water, as well as that of oxygen, as an impurity in the monomer, or in the molecular weight regulator, or, more generally, in the gaseous stream fed to a polymerisation reactor, is deemed to be a sheeting promoting factor. In order to avoid this drawback, it is taught to feed the gaseous stream into the reactor's recycle stream at a point prior to the cooler.

U.S. Pat. No. 4,532,311 teaches that sheeting can be avoided by introducing into the reactor a chromium compound in such a way that the reactor's walls are contacted by the said compound, before starting the polymerisation with a Ziegler-Natta type catalyst.

U.S. Pat. No. 5,648,581 describes a method for reducing sheeting based on measuring the current flow due to electrostatic charges transferred from the polymer particles to an electrode placed on the wall of the reactor. The measured flow is then adjusted to positive values close to zero by acting on operative parameters such as monomer or comonomer concentration or temperature of polymerisation.

EP A 811 638 teaches the use of an amine-containing antistatic agent in the polymerisation of ethylene with a metallocene catalyst. A serious drawback of the use of antistatic agents, however, is that these substances have typically the property of depressing the activity of the catalyst or to alter the characteristics of the produced polymer. Water, for instance, is a well known poison for many catalysts commonly used in polymerisation processes.

Methods comprising the variation of the polymerisation conditions can force to operate under conditions which are not optimal for the process or for obtaining the target product. Moreover, it may be impossible to control the parameters influencing the formation of sheets and chunks in a reliable way.

It is known that the tendency to agglomerate of granular particles of polymer, due to electrostatic charges of both positive and negative sign, can be reduced or eliminated by allowing the granular solid to be contacted with a gas subjected to a corona discharge. In Chemie Ing. Techn. 42 (1970) Nr. 5, 294–299 it is described an apparatus suitable for neutralising the static charge of PVC particles, which charge had been created by subjecting the polymer to pneumatic conveying. The neutralisation of the static charges can be due to the fact that the gaseous means in which the solid is suspended is made conductive through ionisation, or that the particles undergo an intense electrical field.

This principle is presently utilised in operations of handling granular solids, for example silo storage.

There is a strong prejudice against the use of gas ionising devices in polymerisation reactors, as can be read in U.S. Pat. No. 4,532,311. According to this patent, it is expected that ionised gas does not travel for a sufficient distance to be effective in neutralising the solid static charges everywhere needed in the reactor.

Contrarily to the teachings of the prior art, it has now been found that it is possible to carry out a polymerisation process, wherein the polymer formed is in the form of solid particles, without incurring in sheeting and formation of particle agglomerates (chunks) simply by subjecting at least part of the reaction fluid or suspension phase to a corona discharge.

Therefore, broadly contemplated, the present invention provides a process for the production of polymers by means of a catalytic polymerisation, wherein the produced polymer is in the form of solid particles and the monomer(s) is (are) contained in a gaseous or liquid reaction medium, characterised in that a corona discharge is established in at least a portion of the space occupied by said reaction medium or by a fluid feed stream sent to the polymerisation zone.

Preferably the solid polymer particles are suspended in said reaction medium, which is preferably in the gaseous state, optionally containing also a suspended liquid phase, which, as well as the gaseous phase, can contain monomers, comonomers, and inert components. More preferably, the solid particles form a fluidised bed kept suspended by a gas stream continuously recirculated through the said bed.

Preferably, the corona discharge is established in a region occupied by the fluid reaction medium. When a fluidised bed process is used, the corona discharge is preferably generated at the upper limit of said fluidised bed. In the case of a gas-phase process carried out in a circulated fluidised bed reactor as described in WO 97/04015, the corona discharge may be generated in the zone where fast-fluidisation conditions are established or in the -as-solid separator or in the gas recycle line; preferably, the corona discharge is generated in the gas recycle line at a point just before the introduction of the gas stream into the zone where fast-fluidisation conditions are established.

It may also be found advantageous to generate corona discharges at more than one point of the apparatus.

BRIEF DESCRIPTION OF THE DRAWINGS

A suitable device for generating a corona discharge within the bed consists of a conductor with needle shaped emitters; each of said emitter is spaced apart from an opposite conductor of suitable form, in order to create a discharge pair.

The voltage difference which must be applied between the elements of the discharge pair must be sufficiently high in order to create a corona discharge, but must lie below the value at which a disruptive discharge may occur. This value depends on the geometry of the discharging device and on the nature of the fluid medium through which the discharge is established. It is typically of several thousands volts: an indicative range of values is from 3,000 to 70,000 volts. Preferably, the voltage difference applied is an AC voltage difference. By making reference to FIG. 1, devices suitable for use in the processes of the present invention comprise a rod shaped inner conductor (1), preferably covered by an insulator (2), having needle shaped emitters (3) disposed perpendicularly to said rod and perforating the insulator (2). A pipe (4) of conducting material surrounds rod (1) and is coaxial with it. Pipe (4) is provided with circular holes (5) in correspondence of each emitter (3), centred on the axis of the latter. A high voltage difference is applied to the rod (1) and the pipe (4); the discharge pair will be thus the point of each emitter (3) and the edge of the corresponding hole (5) on the pipe (4). Preferably the voltage difference applied ranges from 6,000 to 8,000 volts; a suitable value is about 7,000 volts. Advantageously the pipe (4) is grounded and a high voltage is applied to the rod (1).

The dimensions of the device and, in particular., the distance between the elements of the discharge pairs will be chosen to fit the needs of the process, according to the common knowledge of the person skilled in the art. The above described device must be provided with other parts in order to be mounted in the reactor, or, more generally, where needed in the apparatus, and to be connected with an electric generator.

Figure 1:
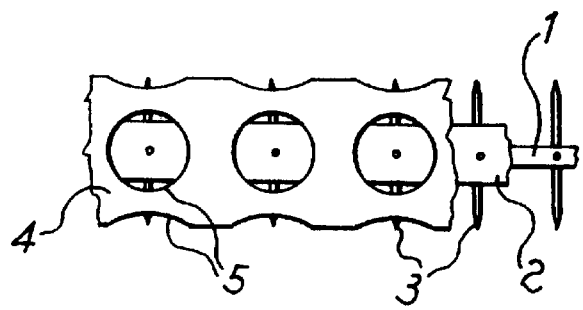
Figure 2:
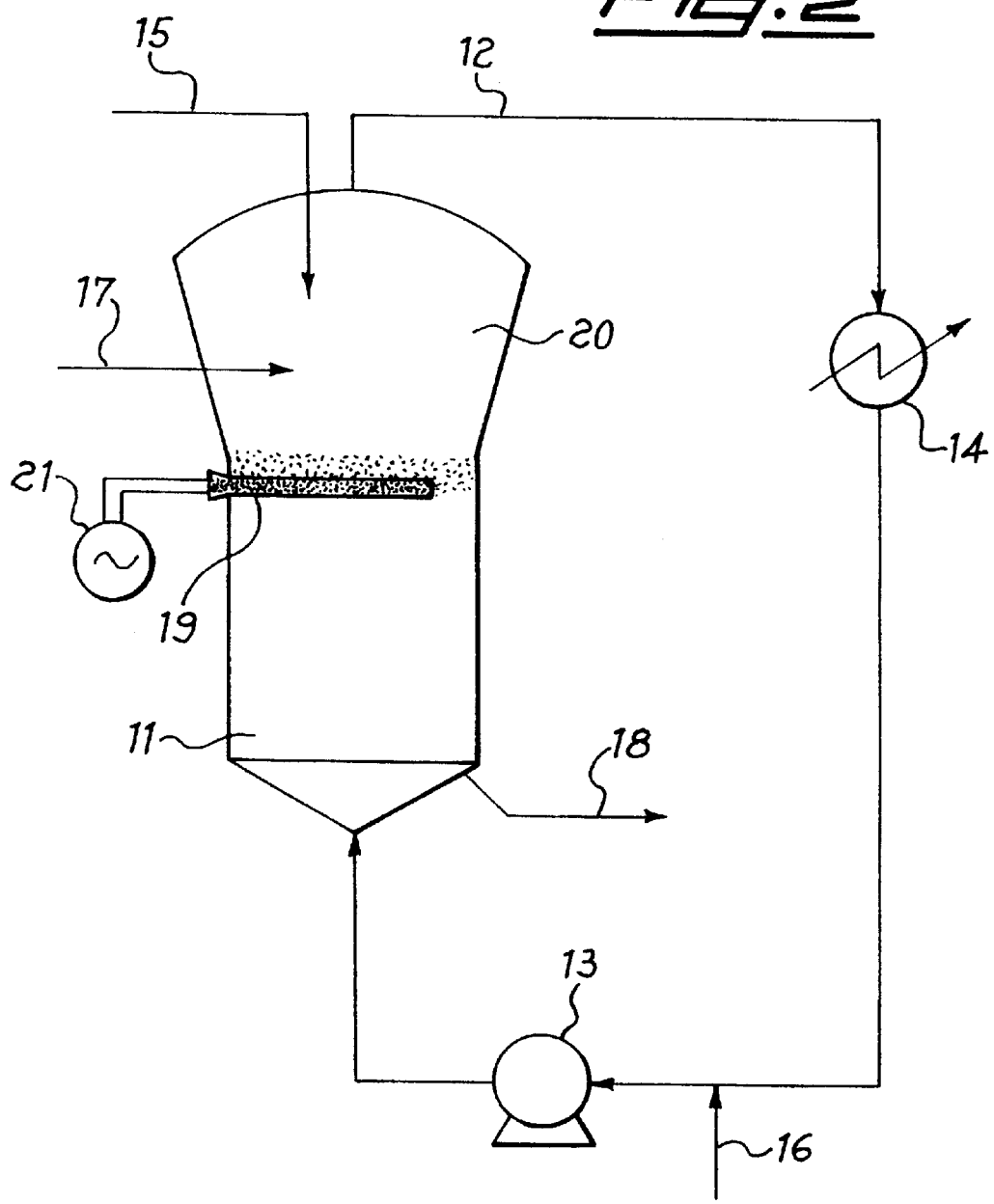

A preferred scheme of the process of the invention is shown in FIG. 2. The polymerisation is carried out in a fluidised bed reactor (11). The gases exiting the reactor are recirculated through a gas recycle line (12) by means of a blower (13) and are cooled in a heat exchanger (14). Monomers are feed into the reactor through line (15) and inert gases into the recycle stream through line (16). The catalyst, optionally prepolymerised in a reactor not shown in the figure, placed upstream with respect to reactor (11), is fed through line (17) into the reactor (11). The solid polymer particles are withdrawn through line (18) from the reactor. A device for establishing a corona discharge (19) of the above described type is placed in the reactor (11), at the lower limit of the enlargement (20) (velocity reduction zone). The conductors forming the discharge pair are connected to an AC voltage generator (21), so that a corona discharge is established.

Hydrogen can be used as a chain transfer agent, to regulate the molecular weight of the produced polymer.

Another object of the present invention is an apparatus to carry out a gas phase polymerisation process, comprising a fluidised bed reactor (11), a gas recycle line (12) equipped with a gas circulating device (13) and a gas cooling means (14), a line for feeding monomers (15), a line (17) for feeding the catalyst into the reactor, a device for withdrawing the solid polymer particles from the reactor; said apparatus further comprises a device (19) for establishing a corona discharge in the said reactor (11), in the gas recycle line (12) or in a gas feed line. Preferably, the device (19) is placed in said reactor (11) and more preferably it is placed at the upper limit of the zone occupied by the fluidised bed (i.e. at the lower limit of the velocity reduction zone (20)). Preferably the device of the type described above is inserted through a hole in the wall of the reactor and protrudes into the latter. Suitable parts are provided to permit the fixing of the device, the sealing of the reactor and the electrical connection to a high voltage source.

The process of the invention can be advantageously used in catalytic polymerisation of one or more monomers chosen from the following groups: α-olefins (e.g. ethylene, propylene, 1-butane, 1-pentene, 4-methyl-1-pentene, 1-hexene, styrene), polar vinyl monomers (e.g. vinyl chloride, acetate, vinyl acrylate methyl methacrylate, tetrafluoroethylene, vinyl ether, acrylonitrile), dienes (e.g. butadiene, 1,4-hexadiene, isoprene, ethylidene norbornene), acetylenes (e.g. acetylene, methyl acetylene), aldehydes (e.g. formaldehyde). Also copolymers of α-olefins with carbon monoxide can be produced according to the process of the invention.

The process of the invention is particularly suitable to prepare polymers or copolymers of α-olefins and copolymers thereof with monomers of other type, for example high density polyethylene (HDPE), linear low density polyethylene (LLDPE), polypropylene (PP), random copolymers (PACO) of ethylene and propylene, and of ethylene or propylene with other α-olefins, ethylene-propylene rubbers (EPR), ethylene-propylene-diene rubbers (EPDM), heterophasic copolymers (HECO).

The use of corona discharge according to the invention is particularly effective in avoiding sheeting in processes for producing homopolymer or copolymers of ethylene, since these processes are otherwise particularly prone to this phenomenon.

Examples of catalysts for the polymerisation of α-olefins which can be used in the process of the invention comprise the reaction product of:

a solid component comprising a titanium compound supported on a magnesium halide in active form and optionally an electron donor compound (inside donor);

an alkyl aluminum compound, optionally in the presence of an electron donor compound (outside donor).

Suitable titanium compounds are Ti halides (such as $TiCl_4$, $TiCl_3$), Ti alcoholates, Ti haloalcoholates.

Another class of useful catalysts are the vanadium based catalysts, which comprise the reaction product of a vanadium compound with an aluminum compound, optionally in the presence of a halogenated organic compound. Optionally the vanadium compound can be supported on an inorganic carrier, such as silica, alumina, magnesium chloride. Suitable vanadium compounds are $VCl_4$, $VCl_3$, $VOCl_3$, vanadium acetyl acetonate.

Other examples are single-site catalysts, i.e. compounds of a metal belonging to groups IIIA to VIIIA (IUPAC notation) of the Periodic Table of the Elements, including elements belonging to the group of the rare earth, linked with a π bond to one or more cyclopentadienyl type rings, utilised with a suitable activating compound, generally an alumoxane. such as those described in EP 129 368. The so called constrained geometry catalysts, such as those disclosed in EP 416 815, can also be used in the process of the invention.

Other useful catalysts are those based on chromium compounds, such as chromium oxide on silica, also known as Phillips catalysts. Other catalysts, that can be used in the process of the invention are described in International patent application WO 96/32010. These catalysts are useful for preparing polyolefins, but are also used for the preparation of copolymers of olefins with other monomers, such as polar monomers of the vinyl type or carbon monoxide.

Other catalysts which can be used in the process of the present invention are those based on compounds which comprise the reaction product of a palladium salt (e.g. palladium acetate) with a bidentate ligand (e.g. 1,3-bis-(di-(2-methoxyphenyl)phosphino) propane). optionally in the presence of the anion of a strong acid. These types of catalysts are useful in the copolymerisation of olefins, especially ethylene, with carbon monoxide to produce polyketones.

It is apparent that the present invention can be advantageously worked to prevent the above described drawbacks with any kind of catalyst employable in polymerisation processes.

EXAMPLES

A solid catalyst component was prepared according to example 1 of EP A 601 525.

EXAMPLE 1

Figure 3:
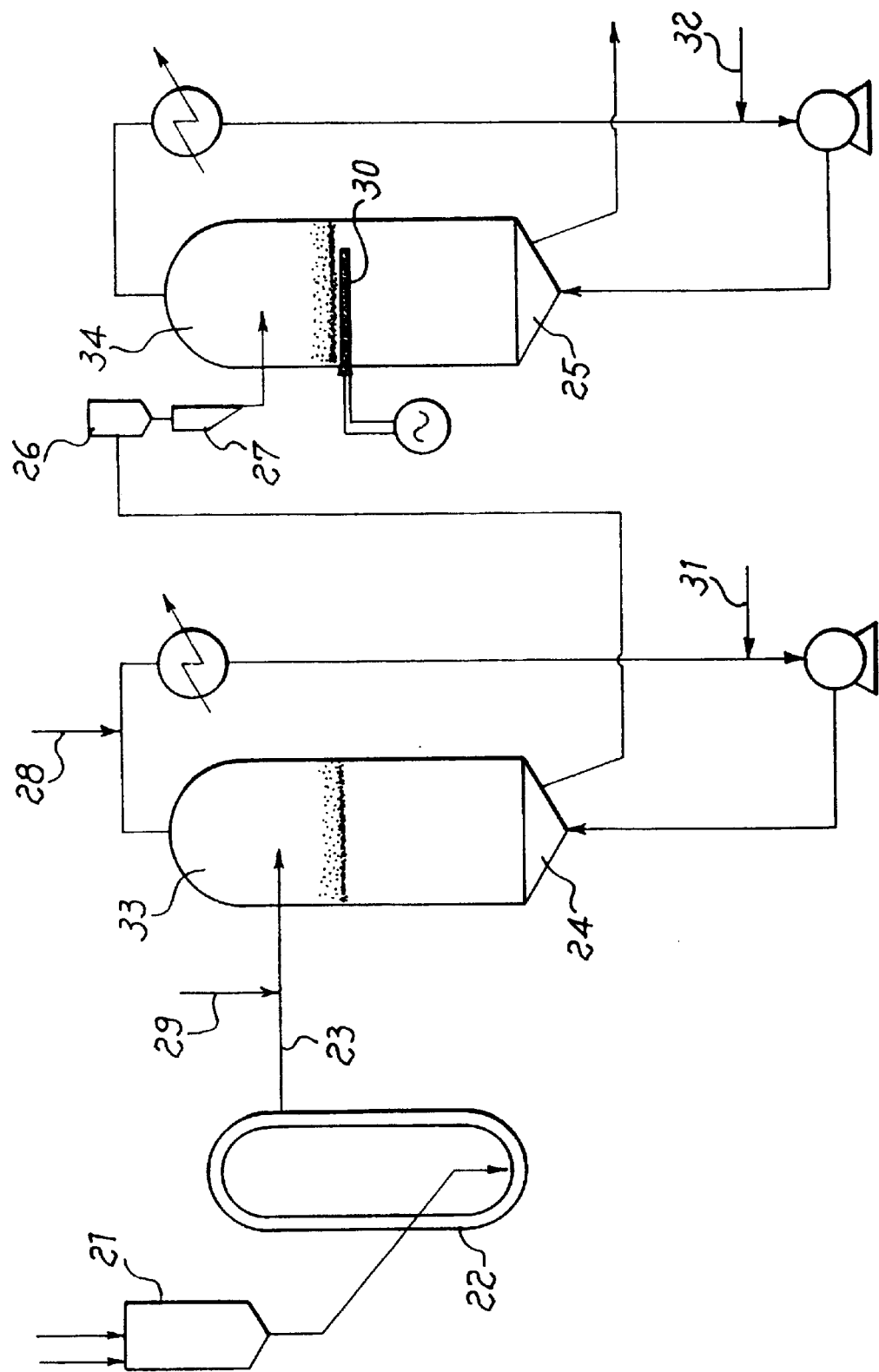

The apparatus of FIG. 3 was utilised. It operates in continuous and comprises a reactor (21) in which the catalyst components (i.e. the catalyst component cited above and triisobutylaluminum—the weight ratio between triisobutylaluminum and the titanium of the solid catalyst component being TIBA/Ti=120) were mixed at a temperature of 15° C. to form the catalyst, a loop prepolymerisation reactor (22) working under slurry conditions, receiving the catalyst formed in the previous step, and two fluidised bed reactors (24) and (25) connected in series, the first reactor (24) receiving the pre-polymer formed in the preceding step through line (23). The polymer formed in reactor (24) was sent to the second reactor (25) after removal of the gas exiting the first reactor (24) from the withdrawn solid in a cyclone separator (26), through a lock hopper (27). The separated gas was recirculated to the first reactor (24). Into the first reactor (24) a chemical, sold under the trademark of Atmer 163 by ICI, was fed as antistatic agent at points (28) and (29), respectively into the recycle line of reactor (24) and into the line carrying the product coming from the prepolymerisation reactor (22). No antistatic agent was fed into the second reactor (25). This reactor was equipped with a device (30) for creating a corona discharge comprising a rod shaped inner conductor with needle shaped emitters disposed perpendicularly with said rod. The device comprises also a pipe surrounding said rod and coaxial with it. The pipe was provided with a circular hole in correspondence of each emitter, centred on the axis of the latter. An AC voltage difference of 7,000 volts was applied between the inner and the outer conductor, the latter being grounded, and a corona discharge was established. The device was placed at the upper limit of the fluidised bed on the reactor's wall and protruded horizontally along the reactor's diameter for a length that is about 80% of the latter.

In the prepolymerisation step, an ethylene homopolymer was produced in the amount of about 300 g/g of solid catalyst component.

In the two-stage polymerisation, an hexene modified HDPE for blow moulding was produced.

The process conditions were as follows:

|  | First reactor | Second reactor |
| --- | --- | --- |
| Temperature (° C.) | 90 | 75 |
| Pressure (barg) | 25 | 24 |
| Ethylene (mol %) | 9 | 17 |
| 1-hexene (mol %) | 0 | 0.5 |
| Hydrogen (mol %) | 16 | 4 |
| Atmer feed (g/h) | 9 | 0 |
| Product rate (Kg/h) | 40 | 97 (final) |
| Melt index "E" (g/10') | 20 | 0.3 (final) |

Propane was fed as inert gas into the recycle line of both reactors at points (31) and (32). The make up monomers were fed directly into the reactor through lines (33) and (34).

The melt index "E" was determined according to ASTM-D 1238.

The real density of the produced polymer was 0.952 $g/cm^3$.

No fouling or sheeting problems occurred in eight days of continuous run. It is known that in a reactor operating without antistatic agent in the second reactor of this example and without the antistatic probe, sheets and chunks would be rapidly formed and the run should be stopped within a few hours to clean the reactor.

EXAMPLE 2

The same apparatus used to perform example 1 was used to prepare HDPE.

The same procedure was followed except that no antistatic agent was fed at any point of the apparatus and both the gas phase reactors were equipped with a corona discharging device like the one applied to the second reactor of the preceding example. A similar device was also placed in the cyclone separator (26) placed in the solids transport line between the two reactors.

The polymerisation conditions in the gas phase reactors were as follows:

|  | First reactor | Second reactor |
| --- | --- | --- |
| Temperature (° C.) | 75 | 75 |
| Pressure (barg) | 24 | 24 |
| Ethylene (mol %) | 7 | 18 |
| Hydrogen (mol %) | 6.8 | 17.5 |
| Product rate (Kg/h) | 50 | 110 |

| | First reactor | Second reactor |
|---|---|---|
| Melt index "E" (g/10') | 1.1 | (final) 1.1 (final) |

Propane was fed as inert gas in both reactors at points (31) and (32).

The real density of the produced polymer was 0.950 g/cm³.

No fouling or sheeting problems occurred in ten days of continuous run, contrarily to what would happen within few hours without the use of the antistatic devices in reactors operated without an antistatic agent.

What is claimed is:

1. Catalytic polymerisation process, wherein the produced polymer is in the form of solid particles and the monomer(s) is (are) contained in a gaseous or liquid reaction medium, characterised in that a corona discharge is established in at least a portion of the space occupied by the said fluid reaction medium or by a fluid feed stream which is sent to the polymerisation zone.

2. The process according to claim 1 wherein the corona discharge is established between elements constituting a discharge pair, the voltage difference applied between the said elements being comprised between 3,000 and 70,000 volts.

3. The process according to claim 1 wherein the solid polymer particles are suspended in the reaction medium.

4. The process according to claim 2 wherein the reaction medium is a gas and optionally contains also a suspended liquid phase.

5. The process according to claim 3 wherein the solid particles form a fluidised bed kept suspended by a gas stream continuously recirculated through the bed.

6. The process according to claim 4 wherein the corona discharge is established within the fluidised bed.

7. The process according to claim 5 wherein the corona discharge is established at the upper limit of the fluidised bed.

8. The process according to any of the preceding claims wherein the corona discharge is generated by a device comprising a rod shaped inner conductor, said rod shaped inner conductor having needle shaped emitters disposed perpendicularly with the rod and a pipe surrounding the rod and coaxial with it; said pipe being insulated from the rod and presenting a circular hole in correspondence of each emitter, centred on the axis of the latter.

9. The process according to claim 7 wherein the voltage difference applied between the rod and the pipe is an AC voltage difference.

10. The process according to claim 8 wherein the voltage difference applied between the rod and the pipe is of from 6,000 to 8,000 volts.

11. The process according to claim 1 wherein one or more α-olefin, or mixtures thereof with other comonomers are polymerised.

12. The process according to claim 1 wherein an ethylene (co)polymer is produced.

13. An apparatus for performing a gas phase process of polymerisation comprising a fluidised bed reactor, a gas recycle line equipped with a gas circulating device and a gas cooling means, a line for feeding monomers, a line for feeding the catalyst into the reactor, a device for withdrawing the solid polymer particles from the reactor; said apparatus further comprises a device for establishing a corona discharge in the reactor, in the gas recycle line or in a gas feed line.

14. The apparatus according to claim 13 wherein the device for producing a corona discharge is placed at the upper limit of the fluidised bed.

15. The apparatus according to claim 13 or 14 wherein the device for producing a corona discharge comprises a rod shaped inner conductor presenting needle shaped emitters disposed perpendicularly with the rod and a pipe surrounding the rod and coaxial with it; said pipe being insulated from the rod and presenting a circular hole in correspondence of each emitter centred on the axis of the latter.

16. The process according to claim 8, wherein the rod shaped inner conductor is covered by an insulator and the needle shaped emitters disposed perpendicularly with the rod perforate the insulator.

* * * * *